(12) United States Patent
Hetrick et al.

(10) Patent No.: US 6,751,136 B2
(45) Date of Patent: Jun. 15, 2004

(54) DRIVE FAILURE RECOVERY VIA CAPACITY RECONFIGURATION

(75) Inventors: William A. Hetrick, Wichita, KS (US); Scott Hubbard, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 50 days.

(21) Appl. No.: 10/173,045

(22) Filed: Jun. 17, 2002

(65) Prior Publication Data

US 2003/0231529 A1 Dec. 18, 2003

(51) Int. Cl.[7] .................................................. G11C 7/00
(52) U.S. Cl. ........................................... 365/200; 714/6
(58) Field of Search ............................... 365/200; 714/6

(56) References Cited

U.S. PATENT DOCUMENTS 5,974,544 A * 10/1999 Jeffries et al. ................. 713/1
6,243,827 B1 * 6/2001 Renner, Jr. ..................... 714/6

* cited by examiner

Primary Examiner—Vu A. Le
Assistant Examiner—Tuan T. Nguyen
(74) Attorney, Agent, or Firm—Carstens, Yee & Cahoon, LLP

(57) ABSTRACT

A method, program and system for recovering data from a failed drive in a RAID system are provided. The invention comprises assigning a plurality of storage drives within the RAID to a defined volume group. If a failure of a drive in the volume group is detected, the failed drive is removed from the volume group, and data from the failed drive is redistributed to the drives remaining in the volume group. In another embodiment of the present invention, a previously unused drive in the RAID is assigned to the volume group to replace the failed drive, and the data on the failed drive is reconstructed on the newly assigned drive. In yet another embodiment, two or more previously unused drives are assigned to the volume group to replace each failed drive. The data from the failed drive is then re-striped across the remaining drives in the volume group, including the newly assigned drives.

8 Claims, 9 Drawing Sheets

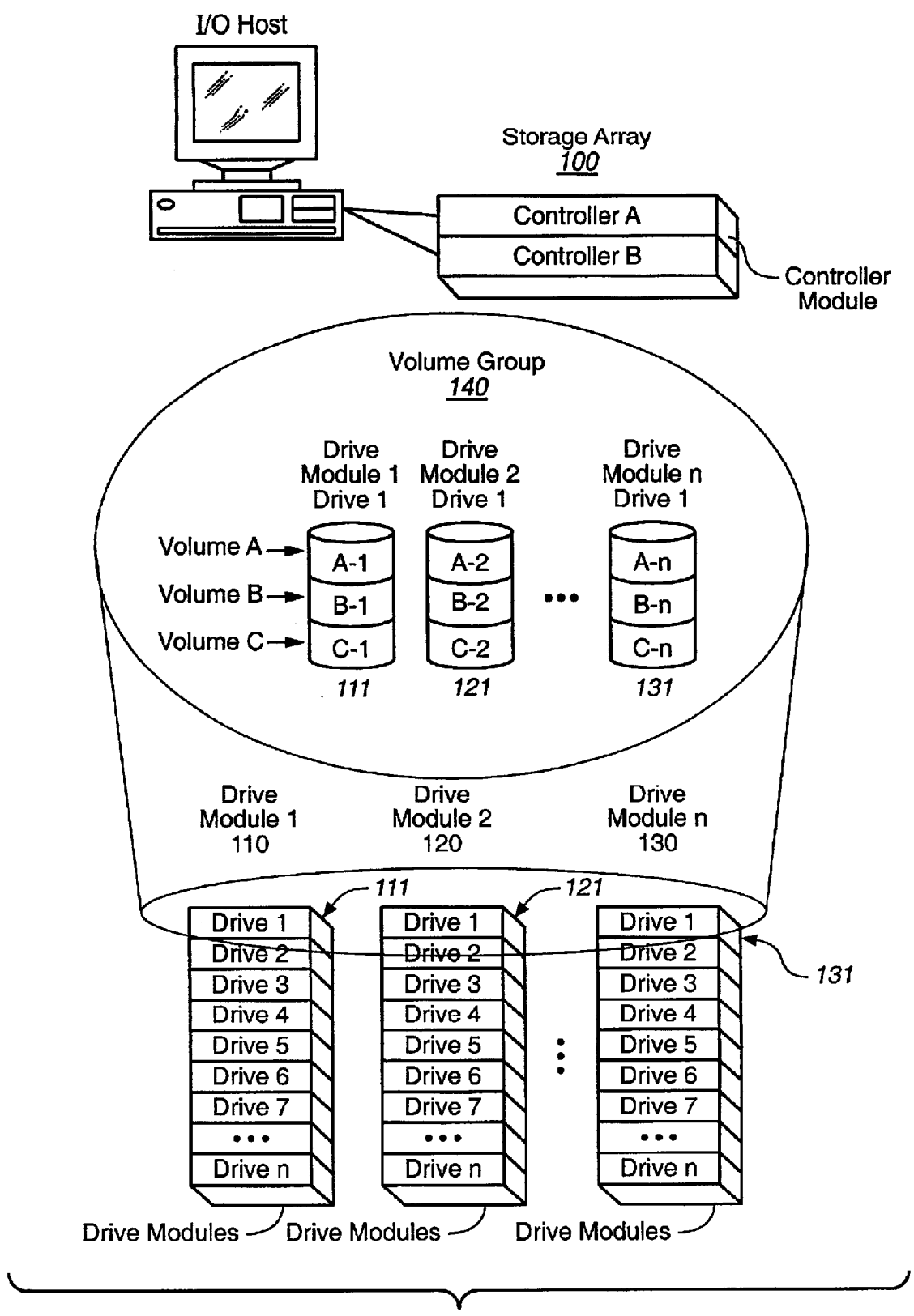
FIG._1

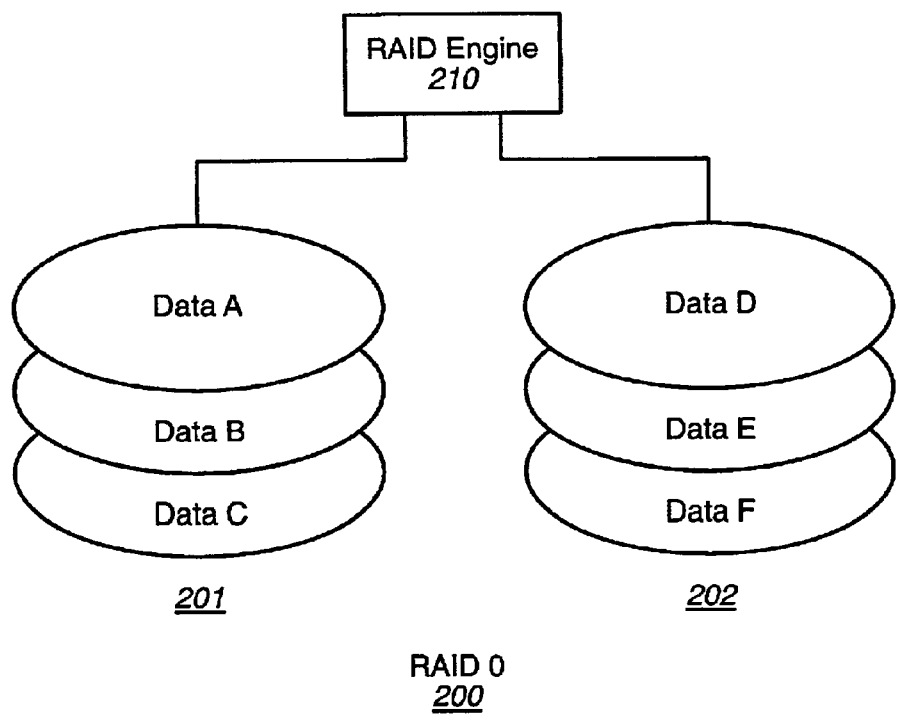
FIG._2 *(PRIOR ART)*
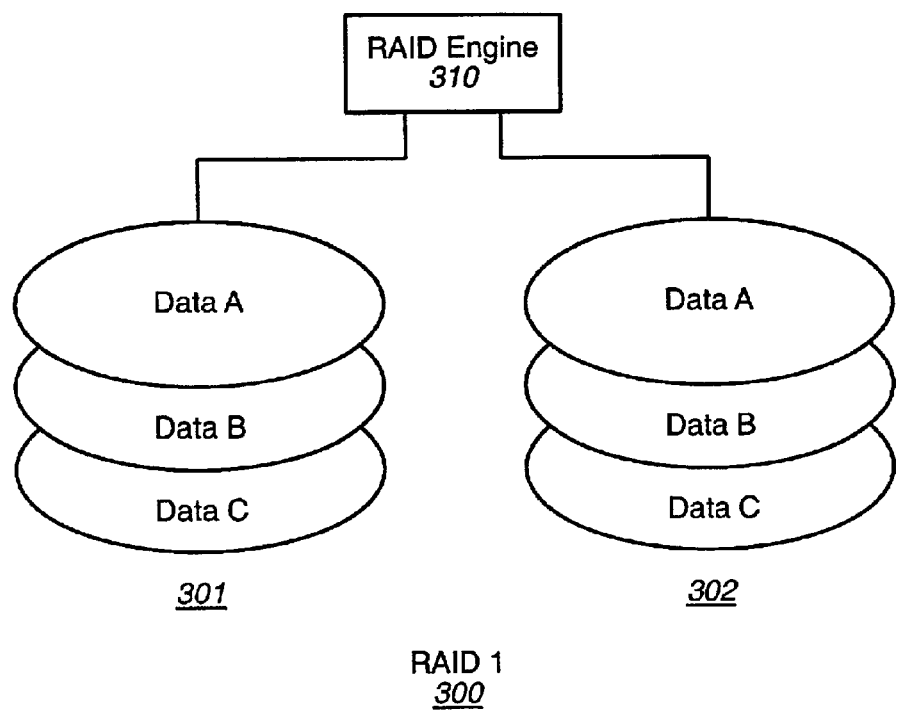
FIG._3 *(PRIOR ART)*

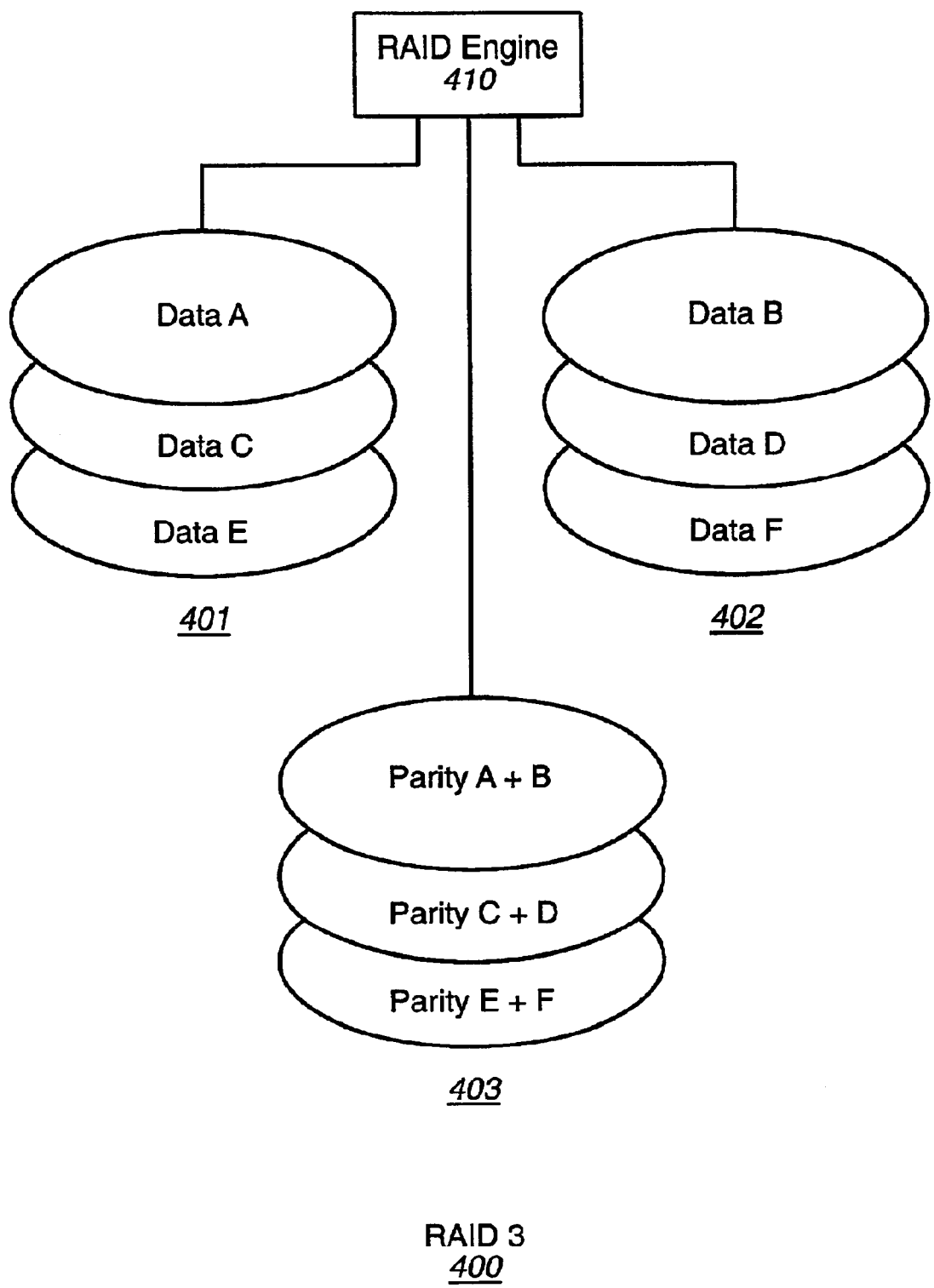
FIG._4 (PRIOR ART)

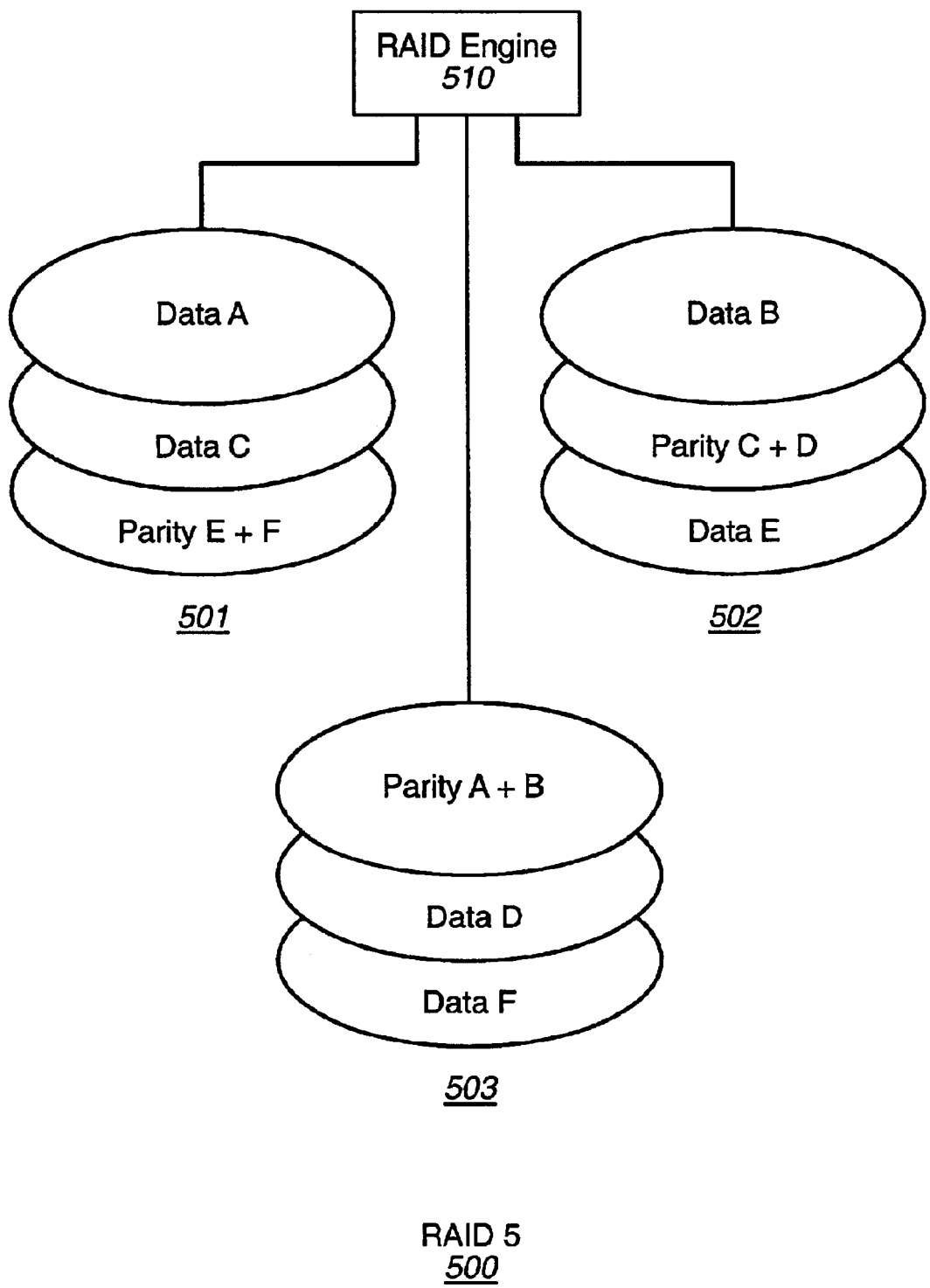
FIG._5 (PRIOR ART)

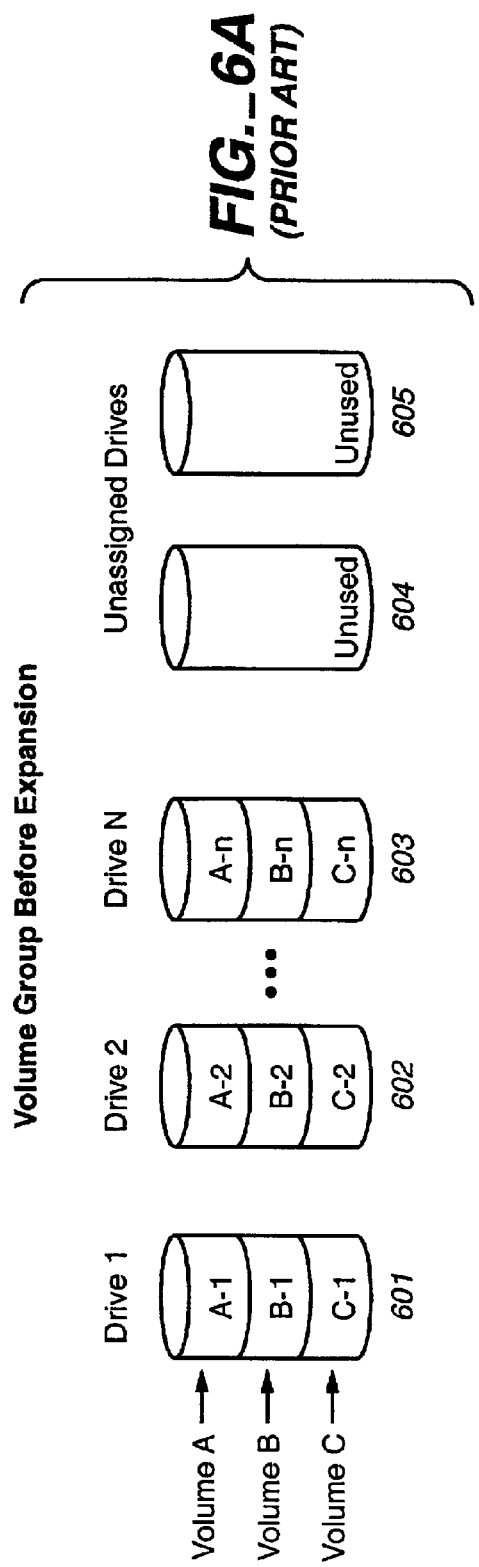
FIG._6A (PRIOR ART)
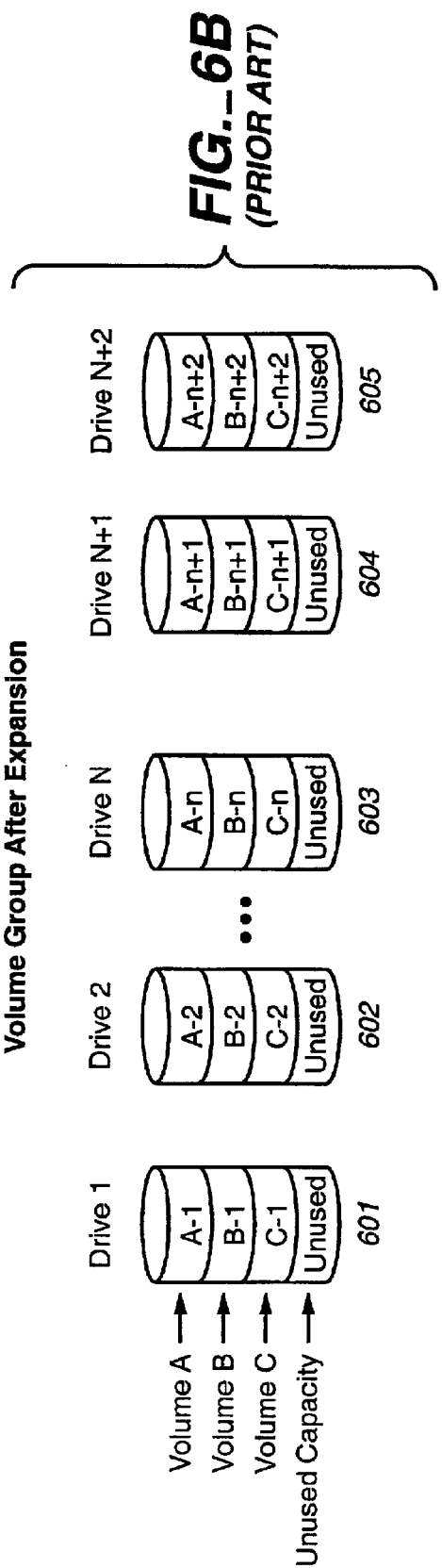
FIG._6B (PRIOR ART)

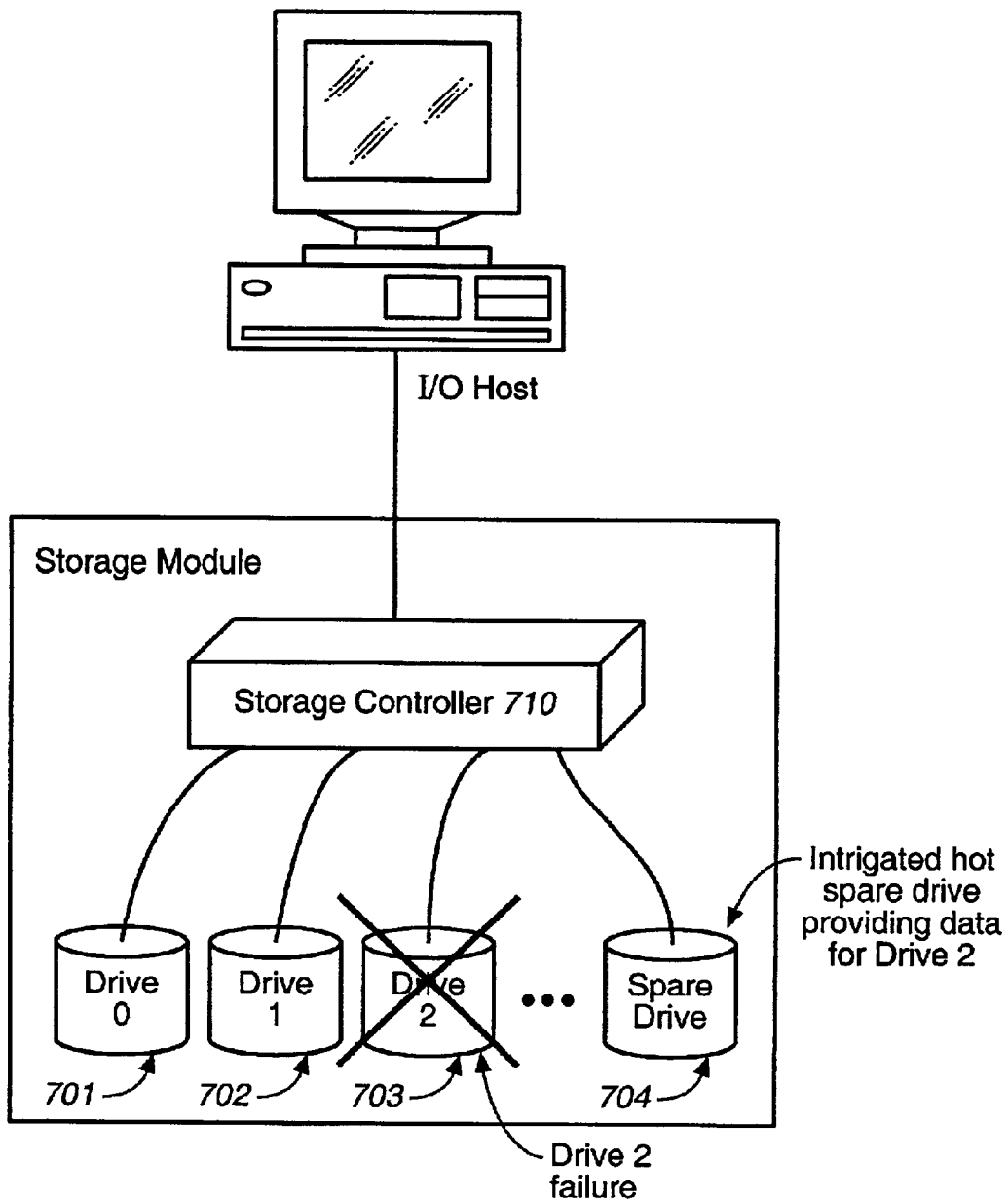
Drive 2 failed. The Hot Spare assumes the data storage responsibilities of the failed drive
FIG._7 *(PRIOR ART)*

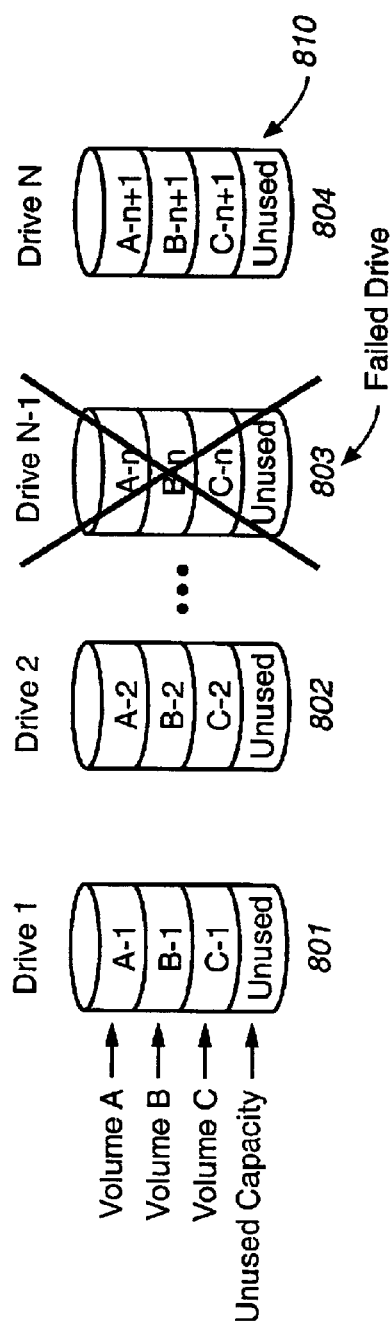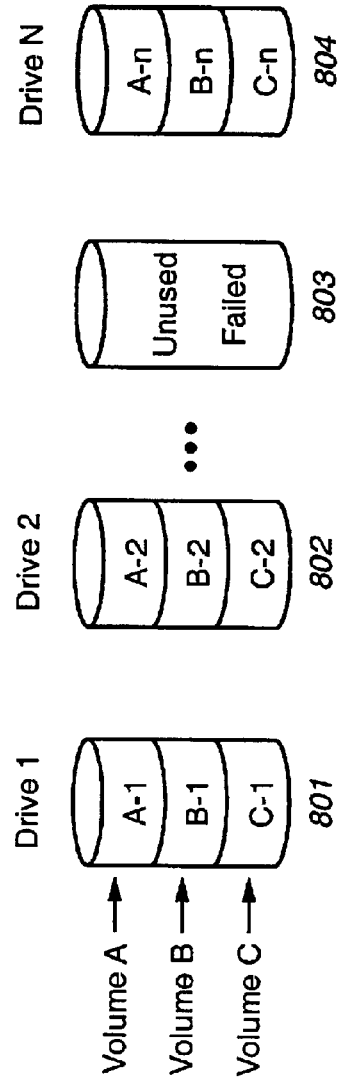

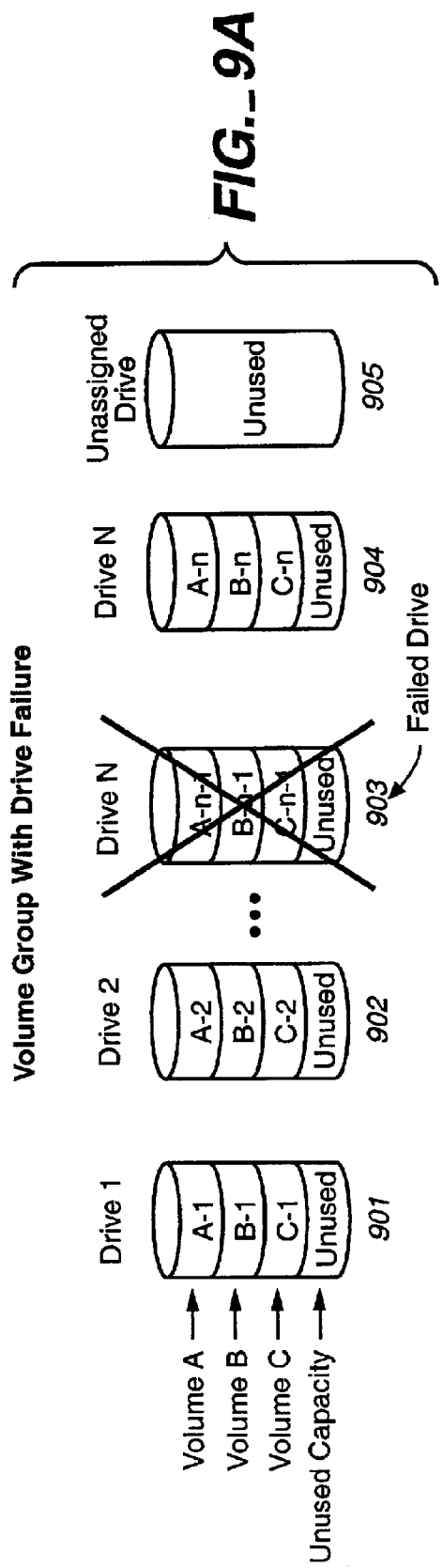
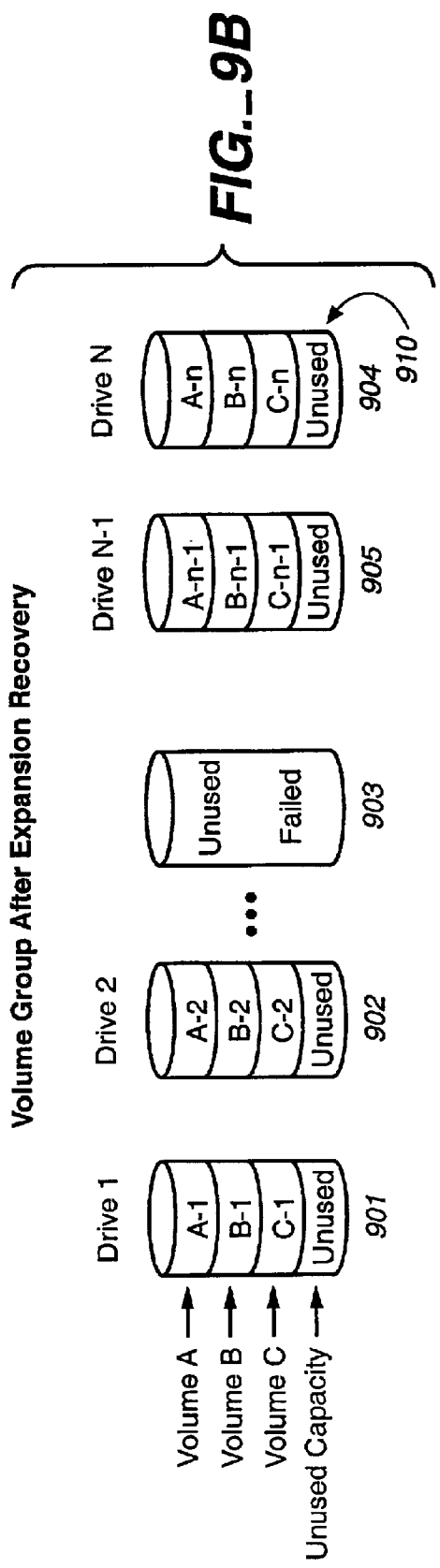

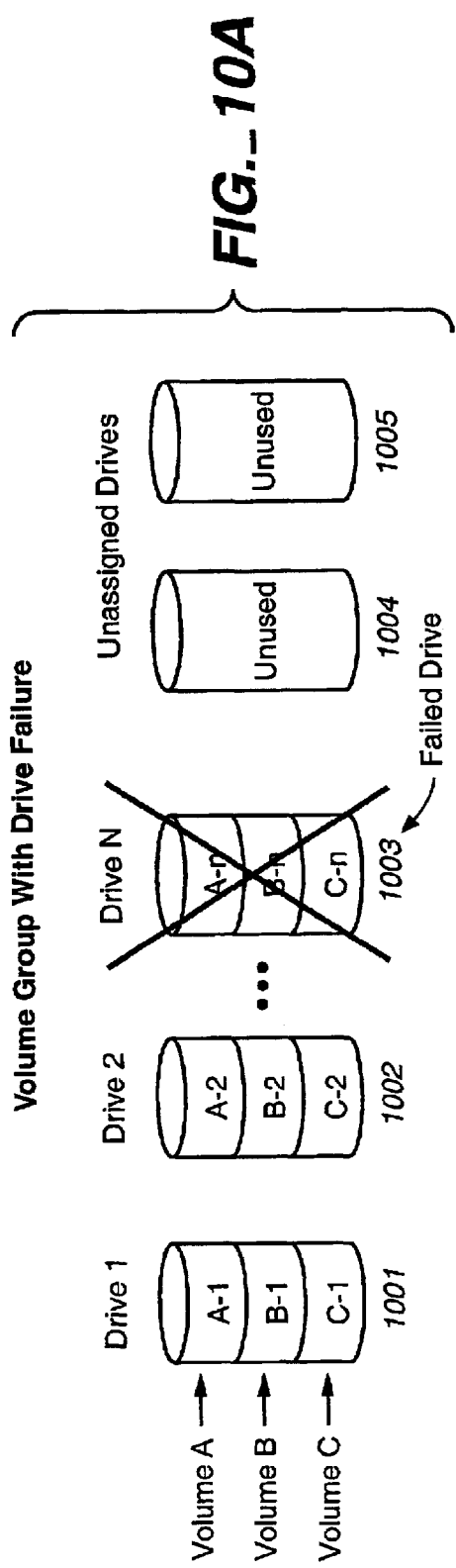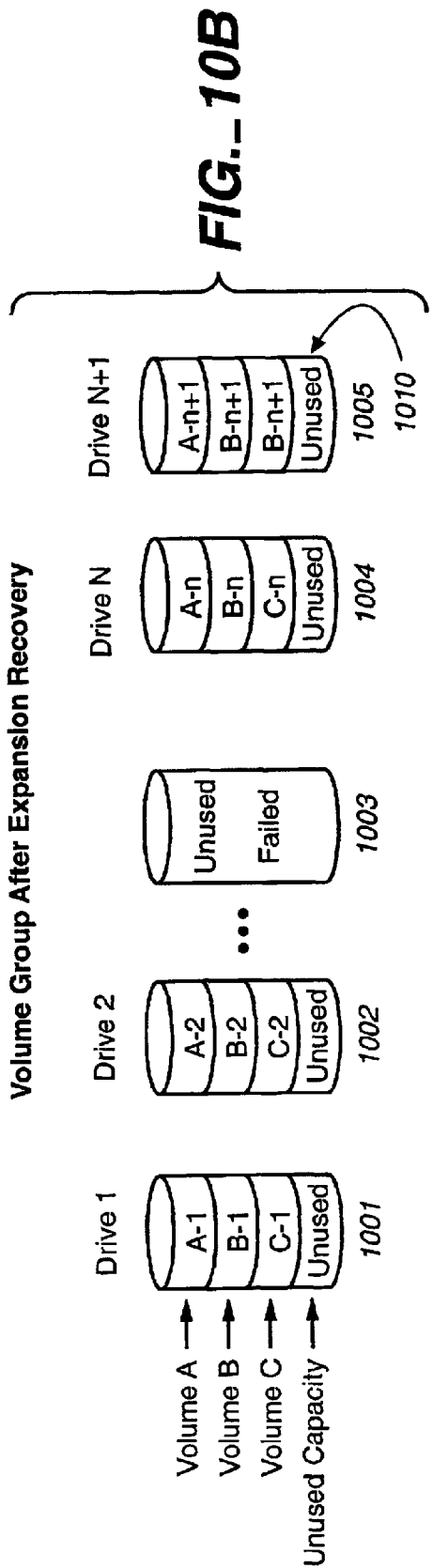

DRIVE FAILURE RECOVERY VIA CAPACITY RECONFIGURATION

BACKGROUND OF THE INVENTION

1. Technical Field

The present invention is directed generally toward a method and apparatus for recovering data from storage drive failures. More specifically, the present invention is directed toward using a dynamic capacity expansion framework to restore the RAID-level redundancy to recover from drive failure.

2. Description of the Related Art

Within a Redundant Array of Independent Disks (RAID) storage system, users create volumes for physical data storage across a collection of drives. Volumes created on the same set of drives are grouped into an array called a volume group. The volume group is assigned a specific RAID level by the user, which defines how the data will be striped across the set of drives and what kind of redundancy scheme is used. Any remaining capacity on a volume group can be used to create additional volumes or expand the capacity of the existing volumes.

Storage controller firmware offers a dynamic capacity expansion (DCE) feature that allows a user to introduce additional drives to a volume group. The additional drives are assigned to the volume group configuration, and volume data is redistributed to include the added drives, thereby increasing the free capacity of the volume group.

When a drive of a volume group fails, the data stored on the volume remains accessible (if the RAID level is non-zero), but redundancy is lost, making the system susceptible to a second fault that could result in data loss. Typically, a user has to replace the failed drive with a new one. The drive replacement event starts a background process in the controller firmware to reconstruct the missing data on the replacement drive. When the data is fully reconstructed on the replacement drive, the redundancy protection provided by the defined RAID level is restored.

To reduce the loss of redundancy time, users can assign unused drives to role of hot spare. When a volume group drive fails, an available hot spare drive takes over the services normally provided by the failed drive. A background process is started to reconstruct the data from the failed drive onto the hot spare. When reconstruction is complete, the RAID redundancy level is restored. When the user replaces the failed drive, data stored on the hot spare drive is copied to the replacement drive to restore the system to an optimal state.

It would be desirable to have a method for using the dynamic capacity expansion feature framework to restore the RAID-level redundancy to recover from drive failure, without requiring the user to replace the drive or have a hot spare drive available.

SUMMARY OF THE INVENTION

The present invention provides a method, program and system for recovering data from a failed drive in a RAID system. The invention comprises assigning a plurality of storage drives within the RAID to a defined volume group. If a failure of a drive in the volume group is detected, the failed drive is removed from the volume group, and data from the failed drive is redistributed to the drives remaining in the volume group. In another embodiment of the present invention, a previously unused drive in the RAID is assigned to the volume group to replace the failed drive, and the data on the failed drive is reconstructed on the newly assigned drive. In yet another embodiment, two or more previously unused drives are assigned to the volume group to replace each failed drive. The data from the failed drive is then re-striped across the remaining drives in the volume group, including the newly assigned drives.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a diagram illustrating a RAID system volume group containing multiple volumes, in which the present invention may be implemented;

FIG. 2 depicts a schematic diagram illustrating a RAID 0 configuration in accordance with the prior art;

FIG. 3 depicts a schematic diagram illustrating a RAID 1 configuration in accordance with the prior art;

FIG. 4 depicts a schematic diagram illustrating a RAID 3 configuration in accordance with the prior art;

FIG. 5 depicts a schematic diagram illustrating a RAID 5 configuration in accordance with the prior art;

FIGS. 6A and 6B depict a diagram illustrating dynamic capacity expansion in accordance with the prior art;

FIG. 7 depicts a diagram illustrating a hot spare drive assuming responsibilities of a failed drive in accordance with the prior art;

FIGS. 8A and 8B depict a schematic diagram illustrating failure recovery, by adding fewer than the number of failed drives, in accordance with the present invention;

FIGS. 9A and 9B depict a schematic diagram illustrating failure recovery, by adding a number of new drives equal to the number of failed drives, in accordance with the present invention; and FIGS. 10A and 10B depict a schematic diagram illustrating failure recovery, by adding a number of new drives greater than the number of failed drives, in accordance with the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, a diagram illustrating a RAID system volume group containing multiple volumes, in which the present invention may be implemented. The RAID storage system 100, is divided into multiple (n) drive modules 1 (110) through n (130), each of which in turn comprises multiple (n) storage drives. Users can create volumes for physical data storage across a collection of drives. For example, in FIG. 1, the data in volume A is divided into n sections (n being equal to the number of drive modules) and each section is stored on the first respective drive in each drive module. Therefore, section A-1 is stored on Drive 1 111 in Module 1 110, section A-2 is stored on Drive 1 121 in D Module 2 120, and section A-n is stored on Drive 1 131 in Module n 130.

Furthermore, multiple volumes created on the same set of drives (e.g., the first respective drives in each module) are grouped into an entity called a volume group. In FIG. 1, volume group 140 comprises three volumes A, B and C. Building on the example above, sections A-1, B-1, and C-1 are stored on Drive 1 111 in Module 1 110, sections A-2, B-2, and C-2 are stored on Drive 1 121 in Module 2 120, etc. As a further example, a second volume group, e.g., volumes D, E and F, might be stored on the second respective drives in each module.

The volume group 140 is assigned a specific RAID level by the user, which defines how the data will be striped across the set of drives and what kind of redundancy scheme is used (explained in more detail below). Any remaining capacity on a volume group can be used to create additional volumes or expand the capacity of the existing volumes.

Referring to FIG. 2, a schematic diagram illustrating a RAID 0 configuration is depicted in accordance with the prior art. A RAID is a disk subsystem comprising two or more ordinary hard disks, and a specialized controller containing the RAID functionality, that is used to increase performance and/or increase reliability. RAID 0 200 improves performance by data striping, which interleaves data across multiple drives 201 and 202, so more than one disk is reading and writing simultaneously. This provides larger volumes than typical disks. However, RAID 0 200 does not provide redundancy. Therefore, a single fault results in data loss.

Referring to FIG. 3, a schematic diagram illustrating a RAID 1 configuration is depicted in accordance with the prior art. RAID 1 300 uses mirroring, which provide 100% duplication of data on two drives 301 and 302. This provides complete redundancy and the highest level of reliability but has the highest cost relative to other RAID levels since it doubles storage costs.

Referring to FIG. 4, a schematic diagram illustrating a RAID 3 configuration is depicted in accordance with the prior art. RAID 3 400 comprises striping with a check disk. For fault tolerance, RAID 3 400 uses parity rather than mirroring. Parity is used to calculate data in two drives and store the results on a third. With RAID 3 400, data is striped across multiple drives 401 and 402, and parity bits are stored on a separate dedicated drive 403. This provides improved reliability over single-drive devices but has a lower cost than RAID 1 300. The performance for RAID 3 400 is suboptimal for write operations less than a full stripe because the check disk 403 must be accessed for all writes.

Referring to FIG. 5, a schematic diagram illustrating a RAID 5 configuration is depicted in accordance with the prior art. RAID 5 500 uses striped parity, in which both data and parity are striped across three or more drives 501–503. Like RAID 3 400, RAID 5 500 has a lower cost than RAID 1 300. However, RAID 5 500 has a higher performance than RAID 3 400 because parity is striped. However, RAID 3 400 still performs better in the case of full-strip writes.

Referring to FIG. 6, a diagram illustrating dynamic capacity expansion is depicted in accordance with the prior art. FIG. 6A depicts a volume group before capacity expansion, and FIG. 6B depicts the volume group after expansion.

Storage controller firmware offers a dynamic capacity expansion (DCE) feature that allows a user to introduce additional drives 604 and 605 to a volume group. When the additional drives 604 and 605 are assigned to the volume group configuration, volume data is redistributed to include the added drives 604 and 605, thereby increasing the free capacity of the volume group.

In the example illustrated in FIG. 6A, the volume group initially comprises volumes A, B, and C stored across drives 601–603, and each volume is divided into N sections (N being the number of drives in the initial configuration), similar to volume group 140 in FIG. 1. Initially drives 604 and 605 are unassigned and unused.

During DCE, drives 604 and 605 are assigned places within the volume group configuration: drive 604 becomes Drive N+1, and drive 605 becomes Drive N+2 in FIG. 6B. Also during DCE, volumes A, B, and C are each re-divided from N sections (in FIG. 6A) to N+2 sections (in FIG. 6B), which are then redistributed across drives 601–405. As part of the expansion, the unused capacity that was previously on drives 604 and 605 when they were unassigned is now redistributed among all of the drives 601–605, as depicted in FIG. 6B.

When a drive of a volume group fails, the data stored on the volume remains accessible (if the RAID level is non-zero, since RAID 0 has no redundancy), but redundancy is lost making the system susceptible to a second fault that could result in data loss. Typically, a user physically replaces the failed drive with a new drive. The drive replacement event starts a background process in the controller firmware to reconstruct the missing data on the replacement drive. When the data is fully reconstructed on the replacement drive the redundancy protection provided by the defined RAID level is restored. To reduce the loss of redundancy time, users can assign unused drives the role of hot spare.

Referring to FIG. 7, a diagram illustrating a hot spare drive assuming responsibilities of a failed drive is depicted in accordance with the prior art. When a drive 703 in the volume group 701–703 fails, an available sot spare drive 704 takes over the services normally provided by the failed drive 703. A background process is started by the controller 710 to reconstruct the data from the failed drive 703 onto the hot spare 704. When reconstruction completes, the RAID redundancy level is restored. When the user replaces the failed drive 703, data stored on the hot spare drive 704 is copied to the replacement drive to restore the system to an optimal state. Hot spare drives reduce the time interval of redundancy loss in the event of a drive failure.

Until the user services the failed drive, the volume is considered non-optimal since the volume definition references a failed drive. The typical method for servicing a failed drive is to remove the failed drive and insert a new replacement drive. When the user replaces the failed drive, data stored on the hot spare drive is copied to the replacement drive. When the hot spare copy process completes, the hot spare is disassociated from the volume, the hot spare returns to a Stand-by mode, and the system state becomes optimal.

The present invention uses the dynamic capacity expansion framework (explained above) to restore the RAID-level redundancy to recover from drive failure without requiring the user to replace the drive or have a hot spare drive available. This feature removes the failed drive from the volume group definition, and introduces zero or more otherwise unused drives to the volume group. This option can be exercised in any drive failure scenario where the volume data is still accessible (i.e. non-zero RAID level), either through the use of mirrored drives (as in the case of RAID 1) or by reconstructing the data from parity data (as in the cases of RAID 3 and 5).

There are three sub-cases of this fault recovery mechanism:

Adding 0 to N–1 drives,

Adding N drives,

Adding more than N drives,

Where N is the number of failed drives in the volume group.

Referring to FIG. 8, a schematic diagram illustrating failure recovery, by adding fewer than the number of failed drives, is depicted in accordance with the present invention. FIG. 8A depicts the volume group with a failed drive. FIG. 8B depicts the volume group after expansion recovery. When adding fewer than the number of failed drives, the re-striping stage of the dynamic capacity feature is exploited to redistribute the data on the surviving drives and any additional drives. If no drives are added, the failed drives are effectively de-integrated from the volume group definition.

For example, in FIG. 8A, the three volumes A, B, and C are each striped across N drives 801–804 (for the purposes of the present example, assume N equals four). When drive 803 fail (as indicated), the controller firmware re-stripes volumes A, B, and C across drive 801, 802 and 804 (depicted in FIG. 8B), so that each volume is now divided into three sections rather than four. For this to occur, volume data on each drive 801, 802, and 804 occupies a larger region of the drive after re-striping than before. Therefore, the drive group needs some unused capacity 810 before the drive failure that can be claimed for volume data during subsequent re-striping. Therefore, by adding fewer (or no) new drives than failed drives, the fault is recovered, but the total volume group capacity is reduced.

Referring to FIG. 9, a schematic diagram illustrating failure recovery, by adding a number of new drives equal to the number of failed drives, is depicted in accordance with the present invention. FIG. 9A depicts the volume group with a failed drive. FIG. 9B depicts, the volume group after expansion recovery. When adding an equal number of drives as the number of failed drives, the DCE feature of assigning new drives is used to relocate the data on the failed drive to the new drive in the volume group configuration. When adding a number of drives equal to the number of failed drives, the net effect is that the failed drive is logically replaced as the inaccessible data on the failed drive(s) is reconstructed on the added drive(s).

For example, in FIG. 9A, volumes A, B, and C are each striped across N drives 801–804 (again, assume for the present example that N equals four). An unused drive 905 is unassigned and is not part of the volume group configuration. When the N–1 drive 903 fails (which in the present example is the third drive), the unassigned drive 905 is assigned a place within the volume group configuration, while the failed drive 903 is removed from the volume group configuration. As depicted in FIG. 9B, the data on drive 903 (A-n-1, B-n-1, and C-n-1) is reconstructed on drive 905, and drive 905 assumes the N–1 position within the volume group configuration.

Similar to the drives 801–804 in FIG. 8, drives 901–903 have unused capacity 910. However, because the data on the failed drive is reconstructed on a new drive 905, there is no need to redistribute the volumes A, B and C across the unused capacity 910. Therefore, when adding a number of new drives equal to the number of failed drives, the fault is recovered and the net total capacity of the volume group remains the same.

Referring to FIG. 10, a schematic diagram illustrating failure recovery, by adding a number of new drives greater than the number of failed drives, is depicted in accordance with the present invention. FIG. 10A depicts the volume group with a failed drive. FIG. 10B depicts the volume group after expansion recovery. When adding more new drives than failed drives DCE is used both to assign new drives to the volume group, as well as re-stripe the data across the drives.

In FIG. 10A, the volumes are distributed across N drives 1001–1003 (for the present example, assume N equals three), and the unused drives 1004 and 1005 are unassigned and not part of the volume group configuration. When the N drive 1003 fails, the unused drive 1004 and 1005 are assigned to the volume group and become drives N and N+1 respectively, and the failed drive 1003 is removed from the volume group (as depicted in FIG. 10B).

Because two new drives 1004 and 1005 are replacing one failed drive 1003, not only is the data on drive 1003 reconstructed, but the entire volumes A, B, and C are re-striped across the volume group, which now contains more drives than before the recovery. In FIG. 10A, before recovery and expansion, each volume A, B, and C is divided into N sections, and each drive 1001, 1002, and 1003 in the volume group is filled to capacity. In FIG. 10B, after recovery and expansion, each volume is divided into N+1 sections, and each drive 1001, 1002, 1004, and 1005 is left with an unused capacity 1010. Thus, when adding more drives than the number of failed drives, the fault is recovered and the volume group capacity is expanded in the same step.

The present invention offers the advantage of additional drive failure recovery options. By implementing the present invention, the system is optimal after reconstruction completes. In contrast, the current hot-spare mechanism must copy data to a replaced drive before restoring the optimal system state. When sufficient unused capacity exists on a drive group, failed drives can be de-integrated by executing this recovery operation with zero drives, allowing RAID level redundancy recovery without hardware replacement. The present invention also provides additional flexibility in storage management strategy. Drives can be held in reserve for either a strict add drive scenario (no failure) or add it in and use it to reconstruct the data but also increase the capacity if desired.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for recovering data from a failed drive in a redundant array of independent disks (RAID) system, the method comprising the steps of:

assigning a plurality of storage drives within the RAID system to a defined volume group, wherein the plurality of storage drives have unused storage capacity;

detecting at least one failed storage drive within the defined volume group;

removing the failed storage drive from the defined volume group; and redistributing data from the failed storage drive to remaining storage drives within the defined volume group, wherein the unused storage capacity of the remaining storage drives is used to accommodate the redistributed data.

2. The method according to claim 1, wherein the step of redistributing the data from the failed storage drive further comprises:

combining data from both the failed storage drive and the remaining storage drives in the defined volume group; and re-striping the combined data across the remaining storage drives in the defined volume group.

3. A method for recovering data from a failed drive in a redundant array of independent disks (RAID) system, the method comprising the steps of:

assigning a plurality of storage drives within the RAID system to a defined volume group;

detecting at least one failed storage drive within the defined volume group;

removing the failed storage drive from the defined volume group;

assigning an unused storage drive in the RAID system to the defined volume group for each failed storage drive removed from the defined volume group; and reconstructing data from the failed storage drive onto the unused storage drive.

4. The method according to claim 3, wherein the net storage capacity of the defined volume group remains the same after the data from the failed storage drive is reconstructed on the unused storage drive.

5. The method according to claim 3, wherein the unused storage drive assumes a logical position in the defined volume group previously held by the failed storage drive.

6. A method for recovering data from a failed drive in a redundant array of independent disks (RAID) system, the method comprising the steps of:

assigning a plurality of storage drives within the RAID system to a defined volume group;

detecting at least one failed storage drive within the defined volume group;

removing the failed storage drive from the defined volume group;

assigning at least two unused drives in the RAID system to the defined volume group for each failed storage drive removed from the defined volume group; and redistributing data from the failed storage drive to remaining storage drives within the defined volume group, including the unused drives.

7. The method according to claim 6, wherein the step of redistributing the data from the failed storage drive further comprises:

combining data from both the failed storage drive and the remaining storage drives within the defined volume group; and re-striping the combined data across the remaining storage drives within the defined volume group, including the unused drives.

8. The method according to claim 6, wherein the net storage capacity of the defined volume group increases after the data from the failed storage drive is redistributed to the remaining storage drives.

* * * * *